United States Patent [19]

Kawanami

[11] Patent Number: 4,540,157
[45] Date of Patent: Sep. 10, 1985

[54] BALL VALVE

[75] Inventor: Isao Kawanami, Nobeoka, Japan

[73] Assignee: Asahi Yukizai Kogyo Co., Ltd., Japan

[21] Appl. No.: 490,957

[22] Filed: May 2, 1983

[51] Int. Cl.³ .............................................. F16K 5/06
[52] U.S. Cl. ................................... 251/315; 251/317; 251/367
[58] Field of Search ........................ 251/315, 317, 367

[56] References Cited

U.S. PATENT DOCUMENTS

| | | | |
|---|---|---|---|
| 3,096,965 | 7/1963 | Margus et al. | 251/315 |
| 3,550,902 | 12/1970 | Pidgeon | 251/315 |
| 3,605,792 | 9/1971 | Westbrook | 251/317 |
| 4,023,773 | 5/1977 | Wise | 251/315 |
| 4,099,705 | 7/1978 | Runyan | 251/315 |
| 4,327,895 | 5/1982 | Blumenkranz et al. | 251/315 |
| 4,411,407 | 10/1983 | Ninomiya et al. | 251/315 |
| 4,449,694 | 5/1984 | Hobart et al. | 251/315 |

Primary Examiner—Martin P. Schwadron
Assistant Examiner—James R. Shay
Attorney, Agent, or Firm—Burns, Doane, Swecker & Mathis

[57] ABSTRACT

A disposable ball valve wherein the union is adhered inside the valve body of the valve housing so as to form the valve chamber for rotatably receiving the ball therein. On the surfaces of the valve body and the union facing the ball, annular grooves of rectangular cross-sections are formed. Within the annular grooves, there are fitted annular seating rings made of polytetrafluoroethylene backed by resilient rubber rings. Thus, the ball and the union do not disconnect from the valve housing by applied fluid pressure, and the sealing performance of the ball valve can be maintained for a long period. In addition, contact surfaces of the valve housing and the tubular caps are formed in the shape of complementary spherical surfaces slidable to each other. Thus, even if the pipelines are deviated from the axis of the flow passage by means of external forces, the ball valve substantially does not receive such excess forces.

2 Claims, 2 Drawing Figures

BALL VALVE

BACKGROUND OF THE INVENTION

1. Field of the Invention

The present invention relates to the field of ball valves, more particularly to disposable plastic ball valves.

2. Description of the Prior Art

Ball valves of the known design are disclosed, for example, in U.S. Pat. No. 3,550,902 and Japanese Unexamined Patent Publication (Kokai) No. 57-37160. Such ball valves include tubular caps having connecting portions for receiving ends of pipelines and abutting against outer end walls of the valve housing. On the external surfaces of the tubular caps, there are provided outwardly extended flanges facing the outer end walls of the valve housing.

The ball valve further includes cap nuts having inwardly extended flanges and internal threaded portions. Thus, firm connection between the valve housing and the tubular caps can be obtained when the internal threaded portions of the cap nuts are threaded onto the external threaded portions of the valve housing.

The ball valve disclosed in U.S. Pat. No. 3,550,902, however, has the following drawbacks:

(a) The union is merely inserted in the valve body, so when the ball is a closed position, the union and the ball tend to disconnect from the valve housing due to upstream-side fluid pressure on the ball when the downstream-side tubular cap is removed from the valve housing, e.g., so as to replace the seating ring or O-ring mounted in the union.

(b) The polytetrafluoroethylene seating rings have no resiliency, so the contact surfaces of the seating rings become worn by rotational friction of the ball. Tight sealing between the ball and the seating rings is therefore soon reduced. Thus, the seating rings must be replaced after a comparatively short period of valve use.

(c) The seating rings contact the annular grooves formed in the valve body and the union at their two sides, so there is a likelihood of the seating rings being extruded into the flow passage when the fluid pressure is applied to the seating rings through the ball.

(d) After the ball valve is connected to the pipelines, the pipelines are apt to deviate from the axis of the flow passage when excess heat or external force is applied. This deviation of the pipelines causes damage to the cap nuts and reduces the tight sealing performance between the valve housing and the tubular caps, between the valve body and the union, and between the union and the ball.

In the construction of the ball valve disclosed in Japanese Unexamined Patent Publication No. 57-37160, the union is threaded into the valve body. Therefore, if the tubular caps and the cap nuts are removed from the valve housing while the ball is in a closed position, the ball and the union do not disconnect from the valve housing due to the applied fluid pressure. As in the case of U.S. Pat. No. 3,550,902, however, the ball is disconnected from the valve housing when the union is removed from the valve body so as to replace the seating rings. In the case of this prior art, periodic replacement of worn seating rings is required. In addition this type of the ball valve has the same drawbacks (c) and (d) as the former ball valve.

SUMMARY OF THE INVENTION

A primary object of the present invention is to provide an improved ball valve which can substantially eliminate the aforementioned conventional drawbacks.

Another object of the present invention is to provide a ball valve wherein the ball and the union do not disconnect from the valve housing under pressure of fluid.

A further object of the present invention is to provide a ball valve wherein the seating rings do not extrude into the flow passage under pressure of fluid, so as to obtain excellent sealing performance over extended valve use.

According to the present invention, there is provided a ball valve comprising a valve housing having a flow passage therethrough; a spherical ball mounted in the valve housing for movement between an open position and a closed position; tubular caps having connecting means for receiving ends of pipelines and abutting against outer end walls of the valve housing, the tubular caps provided with externally extended annular flanges; and cap nuts provided with internally extended annular flanges cooperating with the externally extended annular flanges of the tubular caps and internal threads cooperating with the external threads of the valve housing. This allows firm connection between the valve housing and the tubular caps when the internal threads of the cap nuts are threaded onto the external threads of the valve housing. The valve housing is provided with a tubular valve body terminating at one end with a cylindrical through hole and at the other end with a larger cylindrical through hole, a tubular union adhered inside the larger cylindrical hole of the valve body and having a cylindrical through hole, and a valve chamber formed between the valve body and the union. The valve chamber is intended to rotatably receive the ball having the cylindrical through hole. On the opposite surfaces of the valve body and the union facing the ball, annular grooves of a rectangular cross-section are formed. Within the annular grooves are fitted annular seating rings made of hard polytetrafluoroethylene backed by annular resilient rings made of elastic rubber so as to tightly contact the ball.

In a ball valve according to another aspect of the present invention, outer end walls of the valve housing are found substantially in the shape of convex spherical surfaces having radii centered on the axis of the flow passage. Inner end walls of the tubular caps cooperating with the outer end walls of the valve housing are formed complementary to the convex spherical surfaces of the outer end walls. Inner end walls of the flanges of the cap nuts are formed substantially in the shape of concave spherical surfaces having radii centered on the axis of the flow passage. Outer end walls of the flanges of the tubular caps are formed complementary to the concave spherical surfaces of the inner end walls.

BRIEF DESCRIPTION OF THE DRAWINGS

Further characteristics and advantages of the present invention will become apparent from the following description made with reference to the attached drawings, wherein.

DESCRIPTION OF THE PREFERRED EMBODIMENTS

Figure 1:
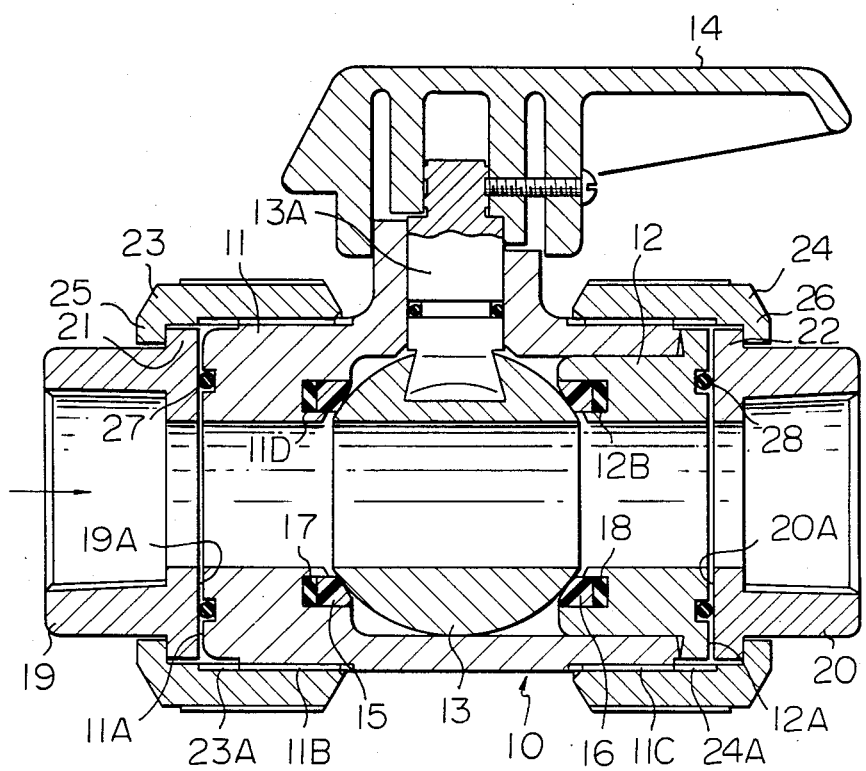
FIG. 1 is a partial cross-sectional view of an elevation of an embodiment of a ball valve according to the present invention.

Referring now to the drawings, Preferred embodiments of a ball valve made by, for example, polyvinyl chloride are illustrated. In FIG. 1, reference numeral 10 indicates a valve housing including a valve body 11 and a union 12.

The valve body 11 is provided with a cylindrical through hole at one end and a larger diameter cylindrical through hole at the other end. The holes coincide and communicate with each other along the axis of the valve housing 10.

The union 12 has a cylindrical through hole and tightly fits inside the larger diameter hole of the valve body 11. The external surface of the union 12 is adhered with the internal surface of the larger hole by means of any suitable adhesive agent so as to form a valve chamber centrally located in the valve housing 10.

Positioned within the valve chamber is a rotatable spherical ball 13 having a cylindrical through hole coinciding with the holes of the valve housing 10. The ball 13 is supported for rotation on two new and improved sets of annular seating rings and back-up rings, which will be described in detail hereinafter.

The ball is intended to be turned by means of a valve stem 13A and a lever 14 connected thereto. It should be noted that the through holes provided in one end of the valve body 11, in the union 12, and in the ball 13 construct a flow passage of the ball valve.

On the surfaces of the valve body 11 and the union 12 facing the ball 13 and adjacent to the flow passage, there are formed two annular grooves 11D and 12B of rectangular cross-sections. The annular grooves 11D and 12B are disposed in parallel with respect to the plane normal to the valve housing axis.

Within the annular grooves 11D and 12B, annular seating rings 15 and 16 made of hard polytetrafluoroethylene backed by annular resilient rings 17 and 18 made of elastic natural or synthetic rubber are fitted. The surfaces of the seating rings 15 and 16 abutting the ball 13 are formed conically, so as to provide tight sealing between the seating rings 15 and 16 and the ball 13. The resilient rings 17 and 18 are formed rectangularly in cross-section and function to urge the seating rings 15 and 16 against the ball 13 with proper pressure.

When the ball 13 is turned into its closed position by operating the lever 14, the fluid pressure upstream of the flow passage is applied to the ball 13. In turn, the fluid pressure may be transmitted to the resilient rings 17 and 18 through the seating rings 15 and 16. Since the seating rings 15 and 16 and the resilient rings 17 and 18 are fitted within the rectangular grooves 11D and 12B, the fluid pressure applied to the seating rings 15 and 16 from the ball 13 is completely transmitted to the resilient rings 17 and 18 and not toward the flow passage. Also, since the sealing rings 15 and 16 contact the inside walls of the rectangular grooves 11D and 12B, at their three sides, there is no likelihood of the sealing rings 15 and 16 being extruded into the flow passage. In addition, since the resilient rings 17 and 18 per se have elasticity, they resist the applied pressure and thrust back the seating rings 15 and 16 toward the ball 13. Consequently, tight contact between the seating rings 15 and 16 and the ball 13 can be achieved. Even if the polytetrafluoroethylene layer of the seating rings 15 and 16 is considerably reduced in thickness by frictional rotation of the ball 13, the sealing performance of the sealing rings is still maintained by means of the elasticity of the resilient rings 17 and 18.

In addition, the resilient rings 17 and 18 function to align the ball 13. When the ball 13 is pressed by fluid pressure and is deviated from its original position, i.e., from the position on the axis of the flow passage, the resilient rings 17 and 18 will thrust back the ball 13 through the seating rings 15 and 16 to bring it back to its correct original position. Thus, the ball 13 can be continuously maintained on the axis of the flow passage.

The end portion of the valve body 11 is provided with an outer end wall 11A abutted to an inner end wall 19A of a tubular cap 19. The end portion of the union 12 is provided with an outer end wall 12A abutted to an inner end wall 20A of a tubular cap 20. The tubular cap 19 is the upstream cap, and the tubular cap 20 is the downstream cap. These tubular caps 19 and 20 include through holes of the same diameter as that of the flow passage of the valve housing 10 and have receiving portions for attaching ends of pipelines (not shown) to the ball valve. O-rings 27 and 28 are disposed between the valve body 11 and the tubular cap 19 and between the union 12 and the tubular cap 20, respectively, to prevent fluid leakage from the ball valve.

Outer end portions of the valve body 11 are provided with external threads 11B and 11C at their external peripheral surfaces for cooperation with internal threads 23A and 24B on cap nuts 23 and 24. The cap nuts 23 and 24 have inwardly extended annular flanges 25 and 26 which cooperate with externally extended annular flanges 21 and 22 on the tubular caps 19 and 20. Thus, firm connection between the valve housing 10 and the tubular caps 19 and 20 can be obtained when the internally threaded portions of the cap nuts 23 and 24 are threaded onto the externally threaded portions of the valve body 11 and when the flanges 25 and 26 come into contact with the flanges 21 and 22.

As described above, because the union 12 and the valve body 11 are adhered to each other by an adhesive agent, even if the downstream tubular cap 20 is removed during the closed condition of the ball valve, the ball 13 and the union 12 will not disconnect from the valve body 11 by fluid pressure. Also, it can readily be understood that repair and replacement of the valve housing 10 or replacement of the O-rings 27 and 28 can be easily effected by loosening the cap nuts 23 and 24 and removing them from the valve housing 10.

Figure 2:
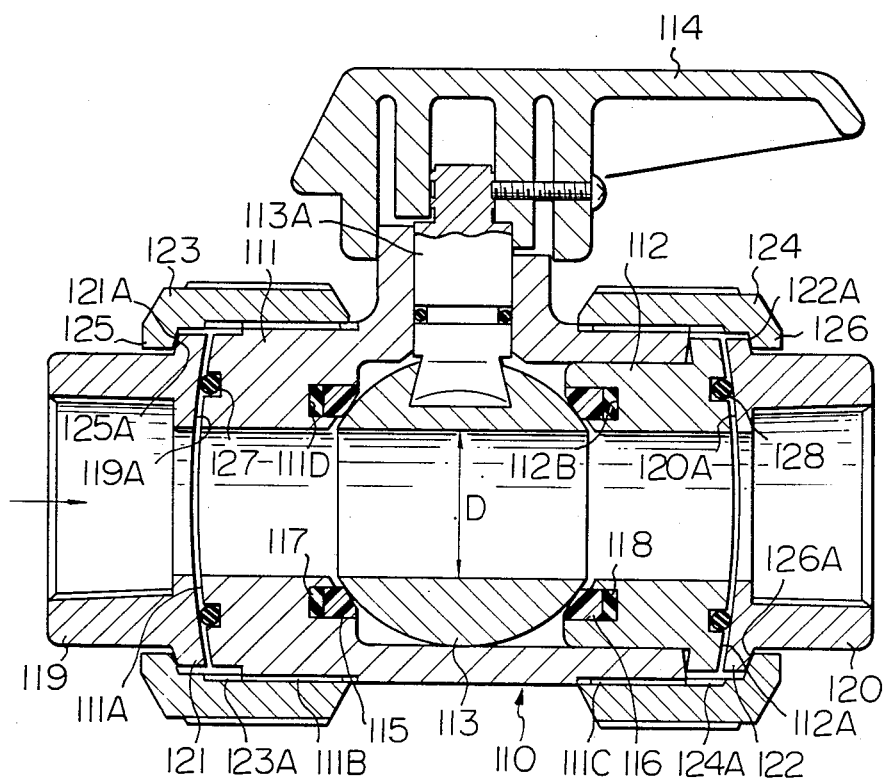
FIG. 2 is a view similar to FIG. 1 but showing an alternative embodiment of the present invention.

FIG. 2 shows an alternative embodiment of the present invention relating to the connective construction between the valve body and the tubular caps.

The ball valve 110 in FIG. 2 includes many similar elements as in the ball valve 10 in FIG. 1. These elements are designated with the same numerals prefixed by the numeral "1" and differ from their counterparts only to the extent mentioned.

In the alternative embodiment, outer end walls 111A and 112A of a valve body 111 and a union 112 are formed substantially in the shape of convex spherical surfaces having radii centered on the axis of the flow passage. Associated inner end walls 119A and 120A of the tubular caps 119 and 120 are formed in the shape of concave spherical surfaces, i.e., the shape of inner end walls 119A and 120A complement the outer end walls 111A and 112A. It should be noted that the above radius centers may be positioned away from the axis of the flow passage.

Inner end walls 125A and 126A of flange portions 125 and 126 of cap nuts 123 and 124 are formed in the shape of concave spherical surfaces having radii centered on the axis of the flow passage. Associated outer end walls 121A and 122A of flange portions 121 and 122 of the tubular caps 119 and 120 are formed in the shape of complementary convex spherical surfaces.

It should be noted that the inner end walls 125A and 126A can be formed in the flat planes normal to the axis of the flow passage. However, as mentioned previously, if such inner end walls 125A and 126A are formed in the shape of concave spherical surfaces, then the complementary convex outer end walls 121A and 122A of the flange portions will cooperate to make a tighter connection between the cap nuts 123 and 124 and the tubular caps 119 and 120.

Outer end walls 111A and 112A of the valve body 111 and the union 112 are preferably formed in the shape of spherical surfaces with large radii. Preferably, they are formed with radii 4 to 20 times the diameter D of the flow passage. More preferably, they are formed with radii 10 to 20 times the diameter D.

After the ball valve is firmly connected to the pipelines, the downstream-side pipeline is apt to deviate from the axis of the flow passage when excess heat or external force is applied by any circumferential conditions. As a result, the tubular cap 120 will deviate together with the pipeline.

In such a case, the tubular cap 120 can be slidably displaced along the spherical outer end wall 112A of the union 112, i.e., the cap nut 124 and the union 112 will not receive excess force. Accordingly the sealing performance between the cap nut 124 and the union 112 will not be spoiled.

The above description is also applicable to the upstream-side pipeline and the tubular cap 119.

The invention has been described in detail with reference to preferred embodiments thereof, but it will be understood that reasonable variations and modifications are possible without departing from the spirit and scope of the present invention.

I claim:

1. A ball valve comprising:
   a valve housing having a flow passage therethrough;
   a spherical ball mounted in said valve housing for movement between an open position and a closed position;
   tubular caps having connected means for receiving ends of pipelines and abutting against outer end walls of said valve housing, said tubular caps provided with externally extended annular flanges; and
   cap nuts provided with internally extended annular flanges cooperating with said externally extended annular flanges of the tubular caps and internal threads cooperating with said external threads of the valve housing;
   said internal threads of the cap nuts being threaded onto the external threads of the valve housing so to firmly connect the valve housing and the tubular caps;
   said valve housing including:
   a tubular valve body terminating at one end with a cylindrical through hole and at the other end with a larger cylindrical through hole;
   a tubular union adhered inside said larger cylindrical hole of the valve body and having a cylindrical through hole;
   a valve chamber formed between the valve body and the union, said valve chamber rotatably receiving said ball having a cylindrical through hole;
   on the opposite surfaces of the valve body and the union facing the ball annular grooves of rectangular cross-sections are formed, within said annular grooves there being fitted an annular seating ring made of polytetrafluoroethylene backed by an annular resilient ring made of elastic rubber so as to urge said seating ring into tight contact with said ball;
   outer end walls of the valve housing being formed substantially in the shape of convex spherical surfaces having radii centered on the axis of said flow passage, and inner end walls of the tubular caps cooperating with the outer end walls of the valve housing being formed complementary to the convex spherical surfaces of said outer end walls; and
   inner end walls of the flanges of the cap nuts being formed substantially in the shape of concave spherical surfaces substantially concentric of said outer end walls of the valve housing, and outer end walls of the flanges of the tubular caps being formed complementary to the concave spherical surfaces of said inner end walls.

2. The device according to claim 1, wherein the ball has a through hole of a diameter D and the convex spherical surfaces of the valve housing are formed with a radii 10 to 20 times the diameter D.

* * * * *